UNITED STATES PATENT OFFICE.

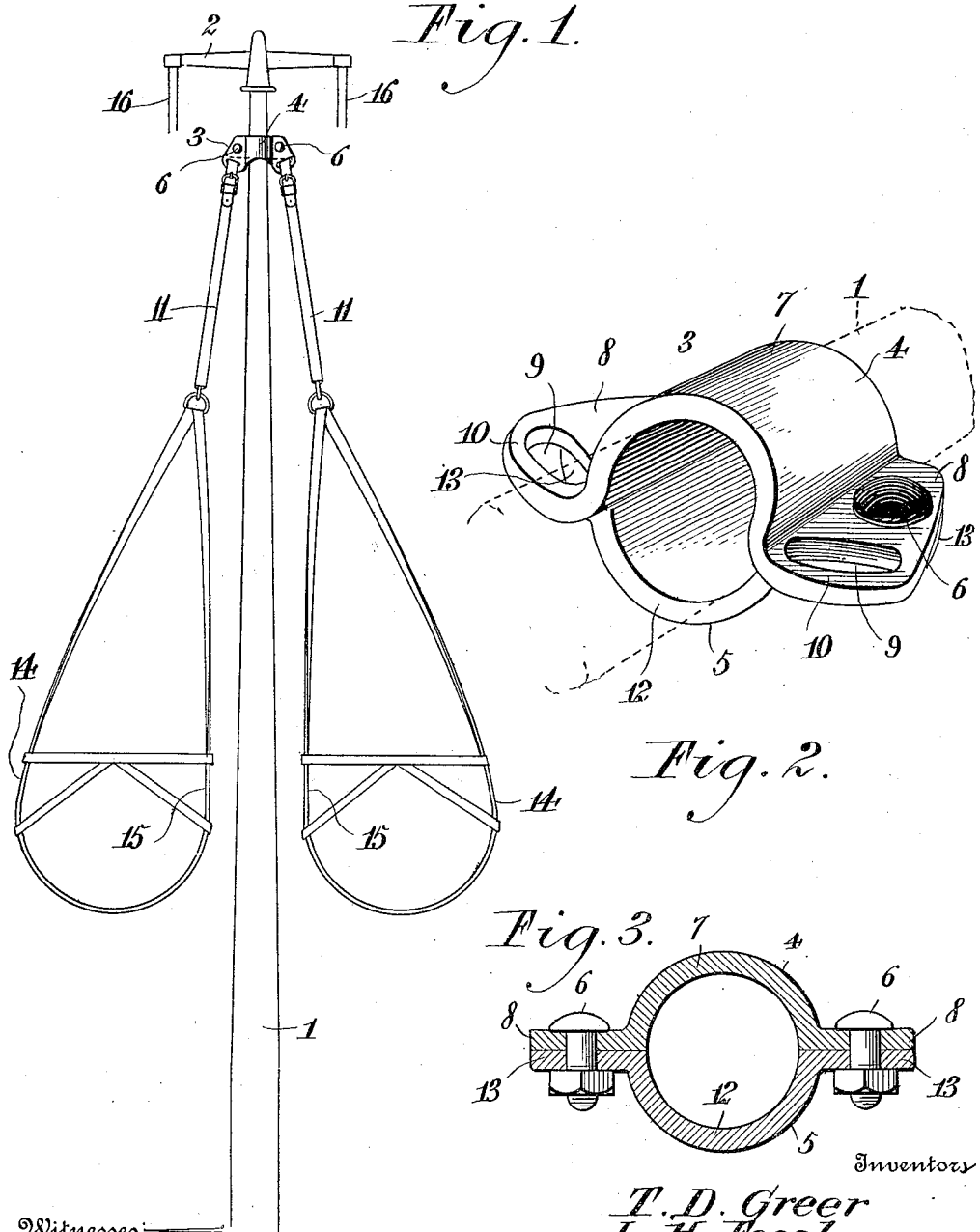

THOMAS D. GREER AND LAWRENCE H. FOSSLER, OF NORTON, KANSAS.

HOLDBACK ATTACHMENT FOR TONGUED VEHICLES.

1,086,291.  Specification of Letters Patent.  Patented Feb. 3, 1914.

Application filed July 25, 1913. Serial No. 781,161.

*To all whom it may concern:*

Be it known that we, THOMAS D. GREER and LAWRENCE H. FOSSLER, citizens of the United States, residing at Norton, in the county of Norton and State of Kansas, have invented new and useful Improvements in Holdback Attachments for Tongued Vehicles, of which the following is a specification.

This invention relates to an improved safety hitch for tongued vehicles and especially with reference to the provision of a novel attacher to be secured on a vehicle tongue at a point near the front end thereof and to be connected to the breechings of a double harness by means of hold back straps so that the tongue is prevented from dropping in the event that the neck yoke or one of the neck yoke straps should break or that such straps should become unbuckled and to also keep the vehicle from running forward on the team in the event of breaking of the neck yoke or neck yoke straps, the invention consisting in the construction, combination and arrangement of devices hereinafter described and claimed.

In the accompanying drawings: Figure 1 is a diagrammatic plan of a wagon or other vehicle tongue and a safety hitch including our improved hold back attacher and showing the attacher on the tongue and connected to the harness breechings. Fig. 2 is a detail perspective view of our improved hold back attacher from the rear side, and indicating the tongue in dotted lines. Fig. 3 is a cross section of the attacher showing the fastening bolts.

For the purposes of this specification the tongue of a wagon, carriage, agricultural machine or other vehicle is indicated at 1 in Fig. 1, provided with the usual neck yoke 2. In accordance with our invention we provide an attacher 3 which comprises a pair of members 4 and 5 detachably and adjustably secured together by bolts 6. The upper member 4 has a substantially semi-cylindrical intermediate portion 7 and a pair of ears 8 at opposite sides of said intermediate portion, directly connected thereto and coextensive in length therewith, so that they brace and strengthen said semi-cylindrical intermediate portion, the ears being substantially triangular in plan and provided at their rear sides with obliquely arranged openings 9 whereby eyes 10 are formed for the attachment of hold back straps 11. The lower member 5 also comprises a substantially semi-cylindrical intermediate portion 12 and a pair of substantially extending ears 13 at opposite sides thereof and which are arranged opposite the ears 8 of the upper member 4 and connected thereto by the bolts 6. The reversely arranged semi-tubular portions 7 and 12 of the upper and lower members form an opening or eye in the center of the attacher, through which the tongue extends and the bolts which connect the members of the attacher together also serve to clamp them firmly on the tongue at any desired point.

The hold back straps 11 are here indicated as attached to outer breechings 14 and inner breechings 15.

In the event that the neck yoke or that one of the usual neck yoke straps 16 should become broken or unbuckled our improved attacher in connection with the safety hitch formed by the breechings and the hold back straps will prevent the tongue from dropping and also prevent the vehicle from running forward on the team as will be understood.

The holdback straps may be attached to inside hame eyes or end of tongues when the harness is not provided with breechings, to prevent the tongue from dropping and also keep the vehicle from running onto the team should the tongue become unhitched, and the team can be held in perfect safety.

We claim:

The herein described hold back attacher for tongued vehicles, comprising a lower member and an upper member each having a semi-tubular intermediate portion and outstanding ears directly on opposite sides thereof, the ears of the upper member corresponding in length with the semi-tubular intermediate portion of said member, extending rearwardly beyond the ears of the lower member and being provided with eyes, in their rear ends, for the attachment of hold back straps, and bolts connecting the ears of said members together and attaching said members to be clamped on a vehicle tongue.

In testimony whereof we affix our signatures in presence of two witnesses.

THOMAS D. GREER.
LAWRENCE H. FOSSLER.

Witnesses:
J. B. SHEPHERD,
C. D. BOWER.

Copies of this patent may be obtained for five cents each, by addressing the "Commissioner of Patents, Washington, D. C."